United States Patent
Baliosian et al.

(10) Patent No.: US 8,150,788 B2
(45) Date of Patent: Apr. 3, 2012

(54) METHOD FOR FORECASTING UNSTABLE POLICY ENFORCEMENTS

(75) Inventors: Javier Baliosian, Montevideo (UY); Ann Devitt, Dublin (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 739 days.

(21) Appl. No.: 12/302,411

(22) PCT Filed: Jun. 2, 2006

(86) PCT No.: PCT/IB2006/051771
§ 371 (c)(1), (2), (4) Date: Nov. 25, 2008

(87) PCT Pub. No.: WO2007/141599
PCT Pub. Date: Dec. 13, 2007

(65) Prior Publication Data
US 2009/0205015 A1 Aug. 13, 2009

(51) Int. Cl.
*G06F 17/00* (2006.01)
*G06N 5/02* (2006.01)

(52) U.S. Cl. .................................................. 706/46
(58) Field of Classification Search .................... 706/46
See application file for complete search history.

(56) References Cited

U.S. PATENT DOCUMENTS
2006/0064283 A1 3/2006 Saidi

OTHER PUBLICATIONS

Baliosian, J. et al. "Finite State Transducers for Policy Evaluation and Conflict Resolution." 5th IEEE International Workshop on Policies for Distributed Systems and Networks, Jun. 7-9, 2004, pp. 250-259.

*Primary Examiner* — Jeffrey A Gaffin
*Assistant Examiner* — Vincent Gonzales
(74) *Attorney, Agent, or Firm* — Coates & Bennett, P.L.L.C.

(57) ABSTRACT

Method for forecasting instable policy enforcement, is described, wherein a behavior dynamic Bayesian network (DBN) model and a policy finite state transducers extended with tautness functions and identities (TFFST) model is analytically composed to derive predictions of the consequences of enforcing a given policy, in particular to detect flip-flop configuration changes in a system. The method comprises the steps of—translating (1) the Bayesian network that holds the Behavior Model (BM) into a finite state transducers extended with tautness functions and identities (TFFST); —computing (2) the union of the Bayesian network (BM) and Policy Model (PM) finite state transducers extended with tautness functions and identities (TFFSTs); —composing (3) the finite state transducers extended with tautness functions and identities (TFFST) produced in the previous step with itself; and—detecting (4, 5, 6, 7) repetitions of events in the input and the output of every possible path; —if at least one repetition is found, detecting a possible instability (9).

6 Claims, 9 Drawing Sheets

FIG. 3 composed with  produces

METHOD FOR FORECASTING UNSTABLE POLICY ENFORCEMENTS

FIELD OF THE INVENTION

The present invention relates to a method for the composition of behavior models and policy models for forecasting of unstable policy enforcement, in particular in the field of network management systems.

BACKGROUND OF THE INVENTION

Policy-based network management (PBNM) systems are a promising but new discipline aimed at automating network management decisions based on experts' knowledge and strategic business objectives.

One of the issues which are hardly ever addressed in PBNM is the stability of the managed system as the result of the interaction between the dynamic network behavior with the autonomous decision making. Yet this issue is central to the design of a self-management networking system comprised of autonomous entities making decisions driven by policies with often unknown consequences. Decisions made by one entity may change the context and configuration of other autonomous entities which may in turn react changing the context and configuration of the first entity triggering a flip-flop and/or cascading change behavior.

SUMMARY OF THE INVENTION

It is possible to model obligation policies and their constraints with finite state transducers (FST). It is also possible to learn patterns of recurrent behavior using Bayesian networks (BN), a structurally similar kind of graph.

The method according to the invention analytically composes both finite state machines to derive predictions of the consequences of enforcing a given policy minimizing flip-flops and uncontrolled re-configuration cascades.

In summary the method comprises the following steps translating (1) the Bayesian network that holds the Behavior Model (BM) into a finite state transducers extended with tautness functions and identities (TFFST_BM),
computing (2) the union of the Bayesian network (BM) and Policy Model (PM) finite state transducers extended with tautness functions and identities (TFFST_BM and TFFST_POL; output: TFFST_0),
composing (3) the finite state transducer extended with tautness functions and identities produced at step (2) (TFFST_0) with the finite state transducer extended with tautness functions and identities produced at step (2) (TFFST_0), the first iteration of the method (TFFST_0 with TFFST_0; output: TFFST_1),
if (4) the composed finite state transducer extended with tautness functions and identities (TFFST_1) has the same event in the input and the output of any possible path, judging (9) a possible instability to be detected.

DETAILED DESCRIPTION OF PREFERRED EMBODIMENTS OF THE INVENTION

Figure 1:
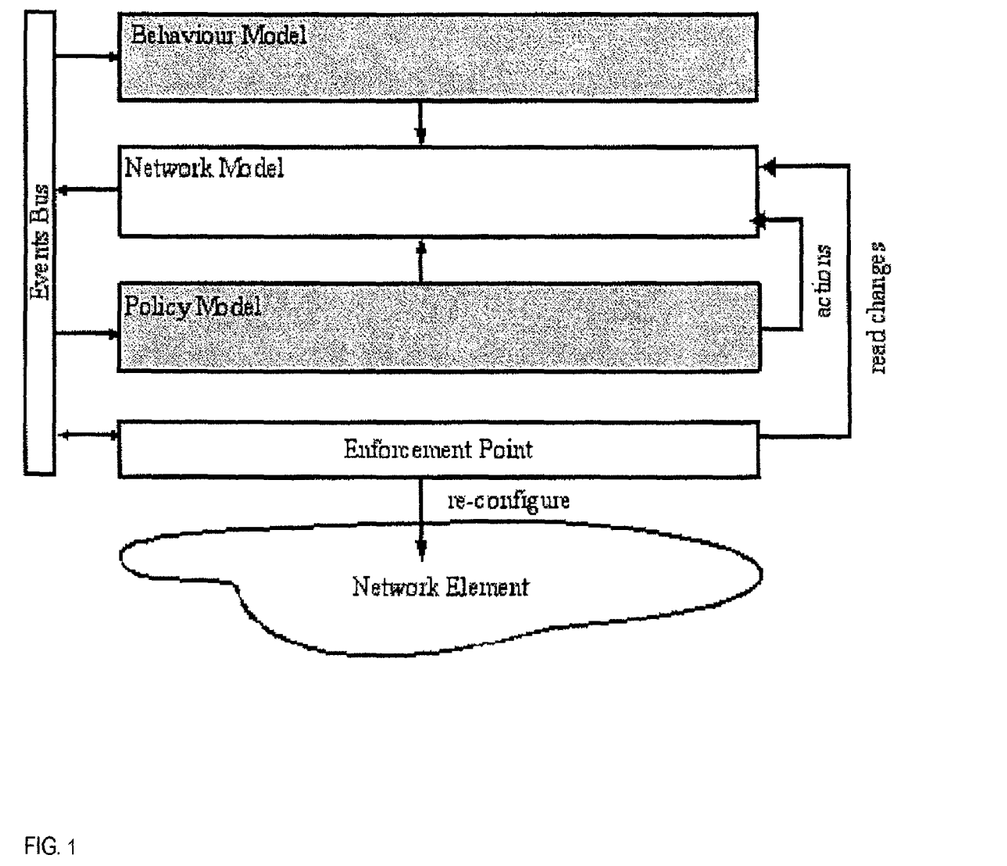
FIG. 1 shows the context architecture for the invention.

The present invention is applicable in the context of an autonomic network management systems. The architecture of such a system is depicted in FIG. 1. Its main feature is the interaction of three different technologies for knowledge capturing and manipulation in order to direct and constrain the behavior of the network elements. These technologies map to the following three components: Local Network Model (LNM), Behavior Model (BM) and Policy Model (PM). The Network Model comprises relatively "static", prior knowledge about network configuration constraints and procedures (although the model instance is updated in real-time). The Behavior Model represents and learns knowledge about the network behavior either as it is realized by management operations or the control plane. The Policy Model (PM) models and enforces experts' knowledge on network configuration and strategic business objectives. This architecture assumes an event-based system.

Events may be messages informing about something happening, such as an alarm or a performance parameter increment event, or service/action requests made by one node to itself or another node. Events are distributed by the Event Bus component.

This architecture, described in more detail in [2], was the platform used to develop the present invention but it may be considered in the context of any other architecture which includes the behavior mode/and the policy model components. The following sections outline the functionality of these two components and how their underlying graphical representations may be composed to predict consequences of configuration changes.

Policy Model

For this invention, policies are essentially condition and action rules where the condition may be same event, for example an alarm or a service request, and the action is the desired response to that condition event, as defined by the operator. The Policy Model in this architecture includes a classical Policy Decision Point (POP) [5], responsible for listening for events coming from the Events Bus and evaluating the conditions and the local policies in order to decide whether a policy condition has been met and therefore the attendant reconfiguration action(s) must be performed in consequence. Policies are modeled using a special kind of finite state machine presented in [1] called Finite State Transducers extended with Tautness Functions and Identities (TFFST).

Figure 2:
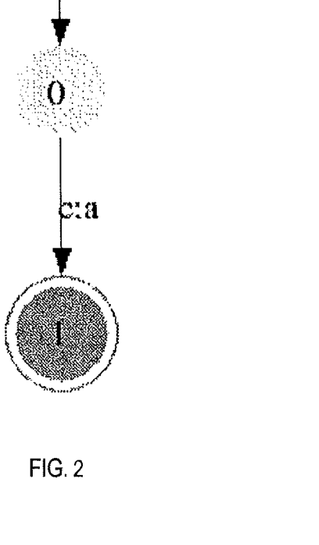
FIG. 2 shows a simple policy rule modeled as TFFST

For example, a simple rule stating "if event c occurs then action a must be triggered" is modeled as the TFFST as shown in FIG. 2. The edges or transitions in a TFFST have an input label (c in FIG. 2) representing the cause event, and an output label (a in FIG. 2) representing the consequent action.

This evaluation model is oriented to the resolution of policy conflicts and is intended to show good policy evaluation performance. Its morphology is relevant to the analytic procedure presented in this invention.

Behavior Model

In any distributed self-managed network, such as that considered here, the network devices exhibit individual behavior in order to fulfill a service and/or user requirements. This individual behavior affects the network as a whole.

Thus, it becomes critical to observe the behavior of network devices in order to evaluate the effects of activities, such as configuration changes of the autonomous management system. The behavior of a network device is represented by the events (actions and notifications) on that network device. The Behavior Model component effectively serves to log and summarize over individual events to give a general view of the activity of a network device.

More precisely, the internal representation of the Behavior Model is a Dynamic Bayesian Network (DBN) which is a state-of-art technology used to monitor different types of behavior with a temporal dimension, for example power consumption of machines or fault propagation in industrial processes.

Bayesian Networks (BN) [3] provides a means of monitoring behavior by specifying the dependencies (and independencies) that hold between aspects of a system, in this instance, events in a network. BN's consists of a directed acyclic graphical structure (DAG), where the nodes represent variables from an application domain, in this case events in a network, and the arcs represent the influential relationships between them. Furthermore there is an associated conditional probability distribution over these variables which encode the probability that the variables assume their different values, for example present vs. absent given the values of other variables in the BN. In the Behavior Model described here, the probability distribution is learnt incrementally on-line for each network device from the event activity of that network device. Time in Bayesian Networks is implicitly represented by the arcs of the model which denote a causal relationship. Dynamic Bayesian Networks [4] are a generalization of Bayesian Networks that explicitly model changes in the model over time with additional temporal arcs. The invention described in this patent exploits this temporal dimension to ensure the sequential nature of events represented in the Behavior Model.

The fact that the Behavior Model is encoded in the graphical structure of a DBN similar to a TFFST structure and modeling the same set of events and actions, means that it may be combined with the TFFST policy model. This combination, in particular using TFFST's operations such as union and composition, is particular advantageous. Section "Forecasting" below describes the general method of the invention and Section "A dynamic standby link" below presents the Dynamic Bayesian Network for an example flip-flop prediction scenario and illustrates how the DBN and TFFST models are composed.

Main Steps of the Invention

Figure 14:
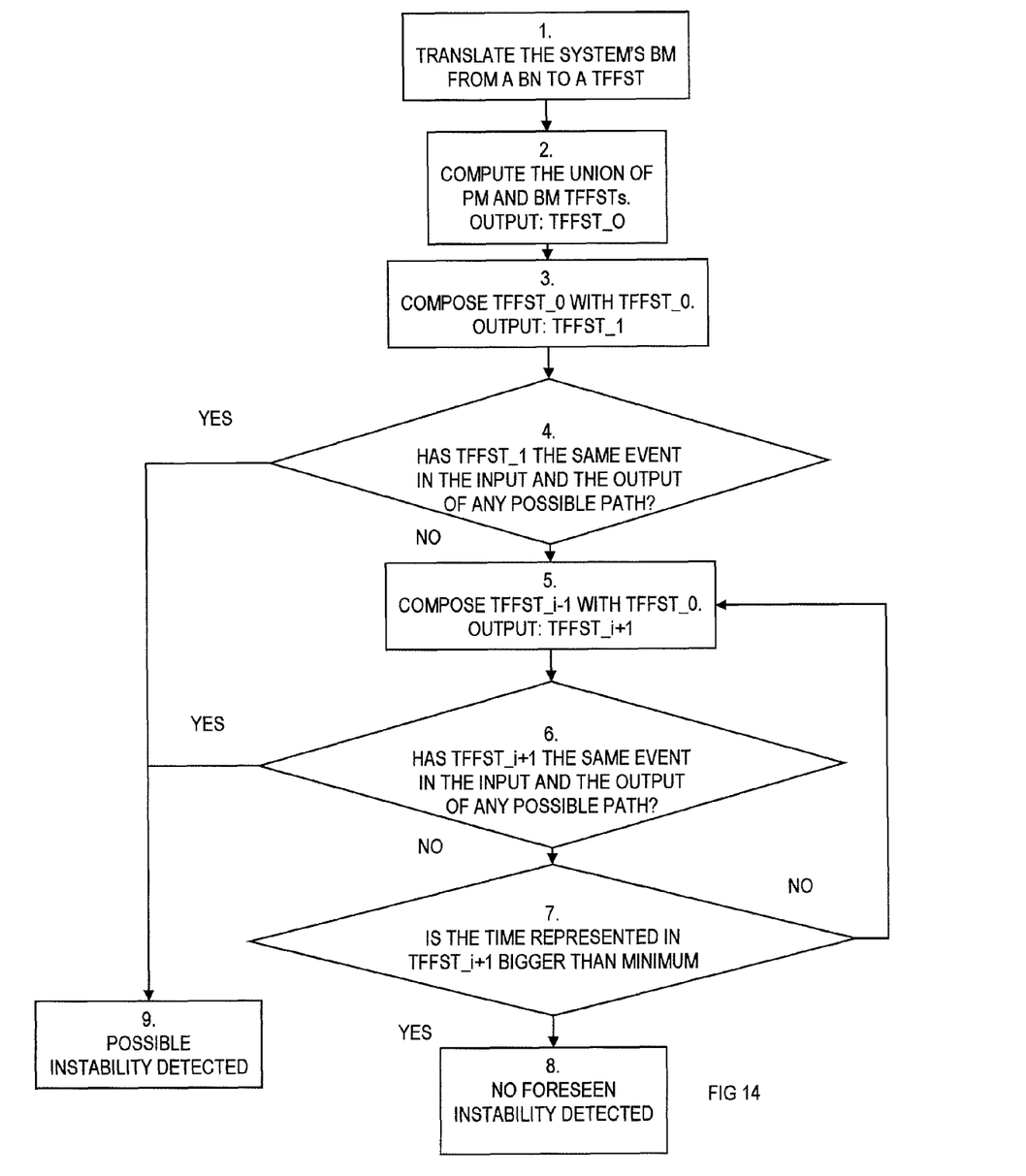
FIG. 14 shows a flow diagram according to the invention for forecasting instable policy enforcements.

According to the invention, the behavior DBN model and the policy TFFST model can be analytically composed to derive predictions of the consequences of enforcing a given policy, in particular to detect flip-flop configuration changes. The steps required to perform the analytic flip-flop detection are illustrated in the flow chart in FIG. 14. The steps are the following:

Translating (1) the Bayesian network that holds the Behavior Model (BM) into a finite state transducers extended with tautness functions and identities (TFFST_BM).

computing (2) the union of the Bayesian network (BM) and Policy Model (PM) finite state transducers extended with tautness functions and identities (TFFST_BM and TFFST_POL; output: TFFST_0).

composing (3) the finite state transducer extended with tautness functions and identities produced at step (2) (TFFST_0) with the finite state transducer extended with tautness functions and identities produced at step (2) (TFFST_0), the first iteration of the method (TFFST_0 with TFFST_0; output: TFFST_1), if (4) the composed finite state transducer extended with tautness functions and identities (TFFST_1) has the same event in the input and the output of any possible path.

judging (9) a possible instability to be detected.

Moreover if no composed finite state transducer extended with tautness functions and identities (TFFST_1) has the same event in the input and the output of any possible path (4) after the first iteration.

composing with the finite state transducer extended with tautness functions and identities produced at step (2) (TFFST_0) (5) the finite state transducer (extended with tautness functions and identities produced at the last (TFFST_1 with TFFST_0: OUTPUT:TFFST_2, or more generally TFFST_i with TFFST_0; OUTPUT TFFST_i+1).

if (6) the composed finite state transducer extended with tautness functions and identities (TFFST_i+1) has the same event in the input and the output of any possible path, judging (9) a possible instability to be detected.

Moreover, if no repetitions of events in the input and the output of every possible path (6) are found, checking (7) if the maximum allowable path length has been exceeded over a minimum value (TFFST_i+1>MIN).

if the maximum path length has been exceeded, judging (8) no instability to be detected.

Moreover, if the maximum path length has not been exceeded, repeating the step in which composing with the finite state transducer extended with tautness functions and identities produced at step (2) (TFFST_0) (5) the finite state transducers extended with tautness functions and identities produced at the last iteration (TFFST_i; TFFST_0; OUTPUT:TFFST_i+1), was performed.

Bayesian Network to Finite State Transducer Conversion

In order to analytically combine the knowledge in the Behavior Model with the knowledge in the Policy Model, we need to translate them to a common representation. We have chosen the TFFST representation on which the policies are already modeled. The nodes of the Behavior Model DAG represent an individual random variable, the range of values that variable can take and the probability of the variable assuming that value given the values of its parent node(s). For our purposes those random variables are the presence or absence of a class of events in the system and the graph is expressing how probable is the causality between a parent node and its son.

As described in Section "Policy model", the TFFST model for the policies each arc represents the desired consequence (the output label) of a given event (the input label) in accordance with the system policy. In the language of the Behavior Model we are setting a causality of probability 1 between the input and the output events. In terms of the Behavior Model, the arcs represent transitions from one value of a random variable to one value of another random variable. In order to convert the Behavior Model DAG to the Policy Model TFFST, the DAG must be compiled out to the representation of transitions between the various states of its random variables.

Figure 3:
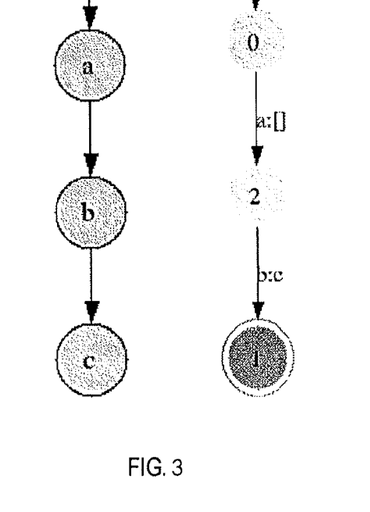
FIG. 3 shows the DBN on the left side being translated into the TFFST on the right

To translate a DBN into a TFFST we create a TFFST in which each event of the DBN is the consequence of its parent events in the DBN graph. The recursive algorithm for doing this basically (i) transforms every DBN state that is not initial into a final state. Then (ii) it finds every valid path in the DBN (i.e. starting on an initial state and finishing in a final state) and (iii) for each path found in the DBN a TFFST is created such that it has an edge for each state in the path except the last one. These new TFFST edges are linked by states in the same order that they appear in the DBN paths. For each of those TFFST edges the input label is the label in the correspondent DBN state and the output label is the null label (also called "epsilon" label) except for the last edge where the output label is the label on the last state of the DBN path. And finally (iv) all the new TFFSTs obtained are joined together by the union operation. For example, in FIG. 3 the DBN on the left is translated into the TFFST on the right. The special symbol "[ ]" means that no output is produced by the transition, in the literature is also known as an epsilon (e) label (see [1] for details on TFFSTs).

Composition of Finite State Transducers

The composition is a precisely defined operation between FSTs. The meaning of composition here is the same as for any other binary relations:

$$R1 o R2 = \{(x;z) | (x;y) \epsilon R1; (y;z) \epsilon R2\}$$

Figure 4:
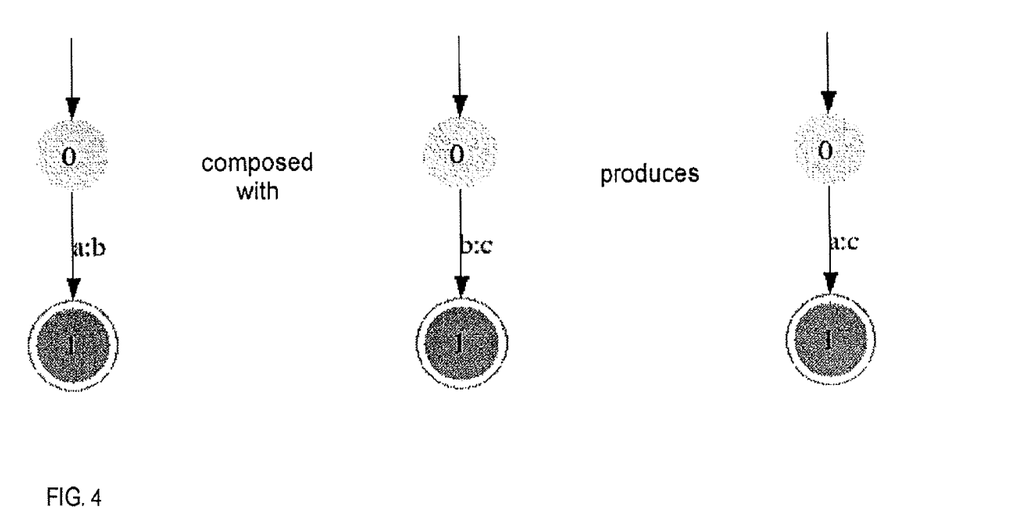
FIG. 4 shows a basic composition example.

This can be seen as a chain of events processing: the events outgoing from the first transducer are taken as input to the second one. However, the whole process is expressed and carried out by a single FST, the one resulting from the composition. For example in FIG. 4, the composition of the first and second FSTs produces the third FST. The details on this operation are in [1].

Forecasting According to a Preferred Embodiment of the Invention

According to the invention, the behavior DBN model and the policy TFFST model can be analytically composed to derive predictions of the consequences of enforcing a given policy, in particular to detect flip-flop configuration changes. The previous two sections have described steps 1, 2 and 3 of the process. This section describes iterative steps 4-9, as illustrated by the flow chart in FIG. 14 and later in this section, we discuss the issue of when to stop this iteration.)

Figure 5:
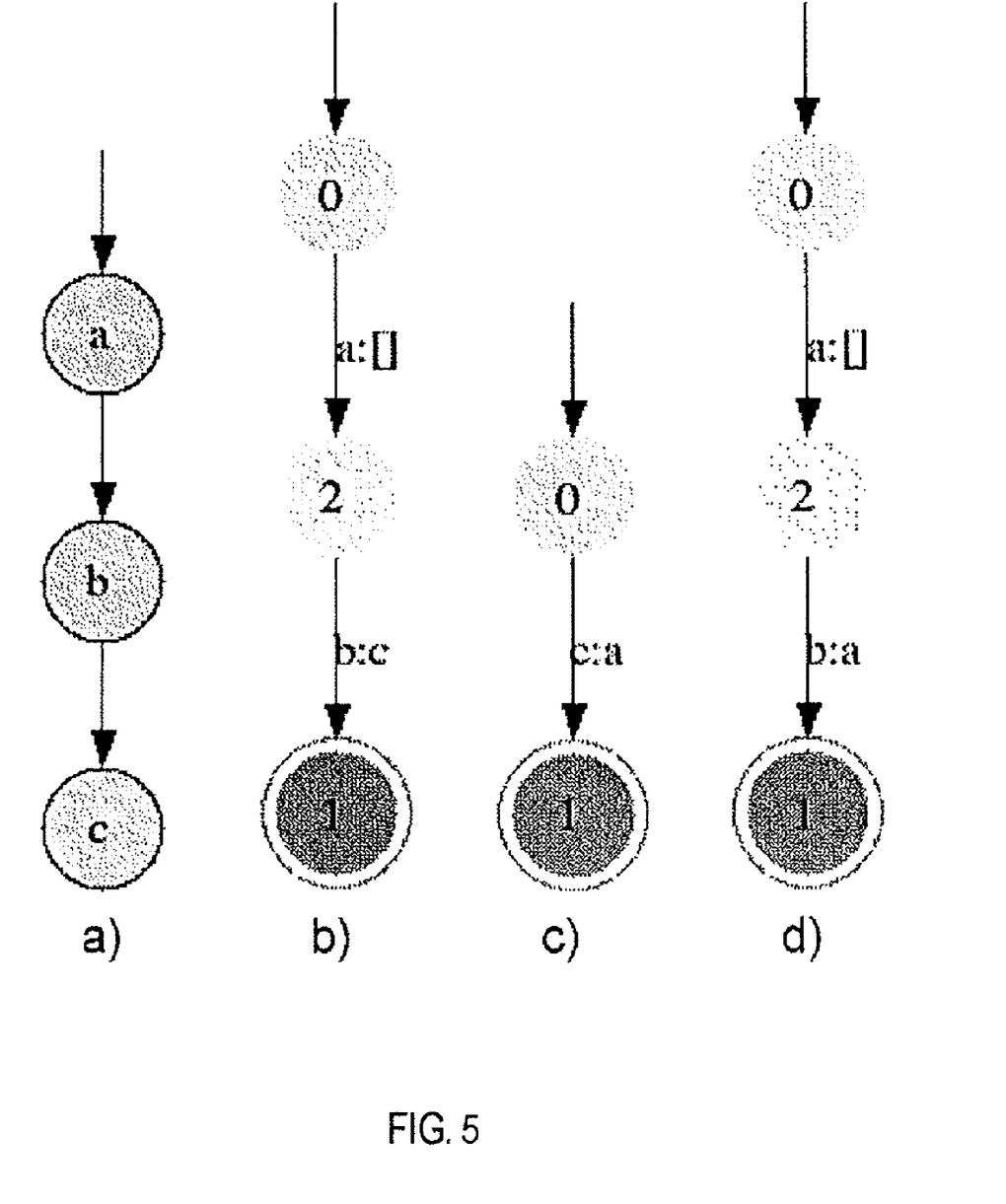
FIG. 5 shows analytic flip flop discovery.

As a high-level example, in FIG. 5, a) represents the discovered pattern of the action a) followed by the action b) and the event c). As seen before, b) represents the same pattern as a TFFST. The TFFST in c) represents the rule "If c) then a)" and d) is the composition of the transducers in b) and c). As in any binary relation, a composition of transducers is the creation of a new transducer such that the output of the first one is used as the input of the second one (see [1] for a detailed description of this operation), in this new transducer we can see the action a) in both sides of the transducer, in the input and in the output. This means that performing action a) eventually (or with a high probability) will cause the execution of the same action a again, a flip-flop behavior that may be prevented by ignoring the rule modeled by c). A detailed and specific example is presented in Section: "A Dynamic Standby Link", below.

When to Stop the Iteration

In the Behavior Model, the probability of the occurrence of an event is computed inside a given sampling time window, each edge in the Behavior Model DAG corresponds with that period of time. Therefore, the DAG's shortest path length 1 times the sampling window corresponds with the shortest period of time the Behavior Model is representing (T min>and the longest path length times the sampling window is the longest period of time modeled (T max). In this way, we can associate each loop in the iteration of steps 3 to 5 with a period of time between T_min and T_max—We are looking for repetitive behavior in short periods of time that will produce a continuous device reconfiguration. If the flip-flop occurs over a medium or long time frame (i.e. days or weeks) the repetition probably constitutes a routine system adaptation. Thus, the iteration must finish when the accumulated time reaches a predefined safe period of time.

A Dynamic Standby Link—An Example

In a 3G network, a RNC node is connected to each of its RBS nodes by a primary link and a secondary standby link. Traditionally, the standby link is a second physical cable which is configured as a standby link when the network is rolled out. This scenario represents a hypothetical network management function in a 3G telecommunications network using IP transport to configure standby links dynamically according to network demands rather than statically at network roll-out time. This function is potentially very useful as standby links reserve specific resources in the nodes they connect and also in any node that cross-connects the link. In this scenario, network nodes which are experiencing high traffic can free up resources by dropping one or many standby links which they cross-connect. Dynamic reconfiguration of stand by links would allow nodes to free up these reserved resources at need for revenue-producing traffic.

Figure 6:
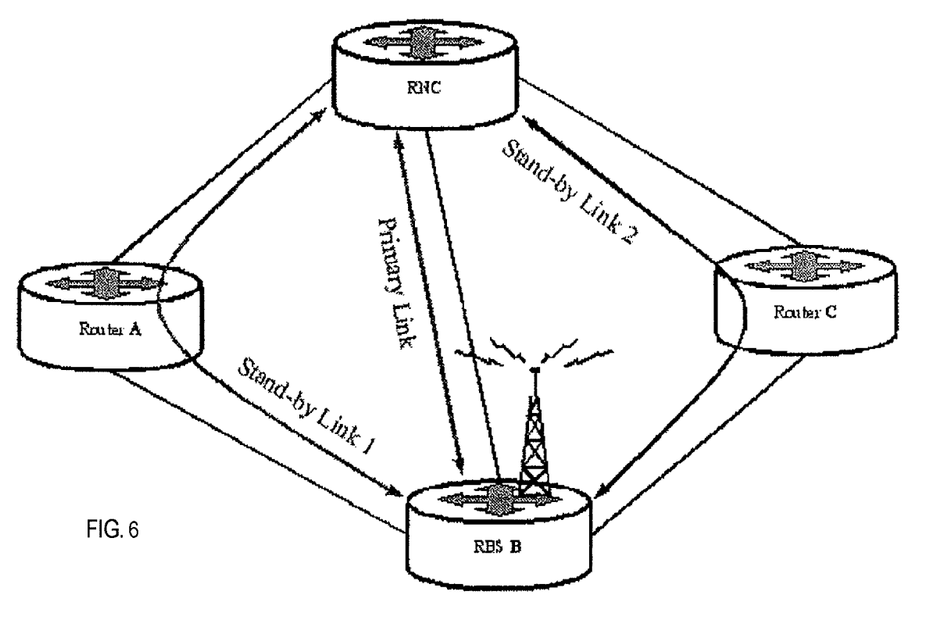
FIG. 6 shows a standby link scenario network scheme

FIG. 6 illustrates this scenario for four network nodes. The standby link between the RNC and RBS B is cross-connected through Router A. This stand-by link therefore has reserved resources in the RNC, RBS B and also Router A. In this example, Router A can drop the standby link between RNC and RBS B if it is experiencing high traffic levels and requires the reserved resources to meet user demand. The network device which governs the standby link configuration, the RNC, will then try to reconfigure a new standby link. This dynamism to configure and drop links "at will" can result in a cycle where the RNC configures a standby link through Router A which then drops the link when it is overloaded whereby the RNC tries to reconfigure the link through Router C which may then drop the standby link again if it is overloaded.

If the traffic load on both Router A and C are not correlated this might not be a problem. The resulting flip-flop may have a large or a medium time scale pace being only a dynamic adaptation but not a disrupting inconvenience. However, if the load of Router A and Router C is correlated, for example if both are in the vicinity of a stadium and on Saturdays the zone receives much more people than on working days, the flip-flop described may occur at a very fast rate, becoming a problem for the devices that would be re-configured continuously. Thus, the desired dynamism may result in an unbounded set of changes where no standby link is stable for any substantial duration as the area itself is inherently overloaded suggesting that some long-term solution must be found.

It is this kind of instability that this invention is designed to foresee and hence avoid. The sections below outline the policies, configuration actions and behavior model for this scenario and describe how the composition of the policy model and behavior model can identify the cycle of reconfiguration actions and therefore stop the cycle.

Messages

In this example, the workflow of the system is driven by messages that are interchanged or broadcasted between the managed nodes. Those messages may be events, meaning messages informing about something happening, or services/actions requests made by one node to another. The relevant messages for this example are:

reqA and reqC: a standby link acceptance request message sent from RNC to Router A and Router C respectively.

dropA and dropC: a message from Router A or Router C sent to the RNC requesting to drop the stand by link thought them.

oLoad: the set of events informing about a node overload.

oLoadA: an event informing that specifically Router A is overloaded. oLoadC: an event informing that specifically Router C is overloaded.

sat: a time event stating that it is Saturday.

Policies

Figure 7:
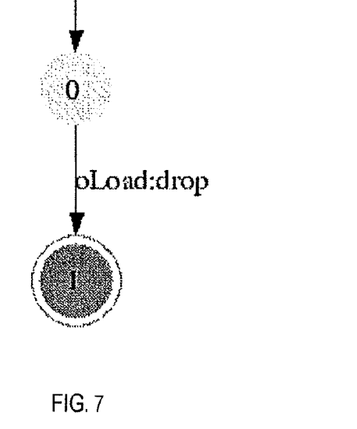
FIG. 7 shows Policy 1 as a TFFST

The system presented in this simple example is governed by only one policy that tells the nodes what to do when they are overloaded in order to gain resources. Thus the preferred way to gain resources is to drop hosted standby links that are reserving resources but not using them. The TFFST model for this policy is depicted in FIG. 7.

Policy 1: If the node N is overloaded then ask N.rnc to reroute standby links which are currently routed through N.

Behavior Model

Below there are the DBN model and its translation to the FST model of the facts learned by the system. For simplicity we are disregarding the probability of the correlation between events, this is equivalent to assuming that two successive events in the DBN are correlated with a probability of 1.

Figure 8:
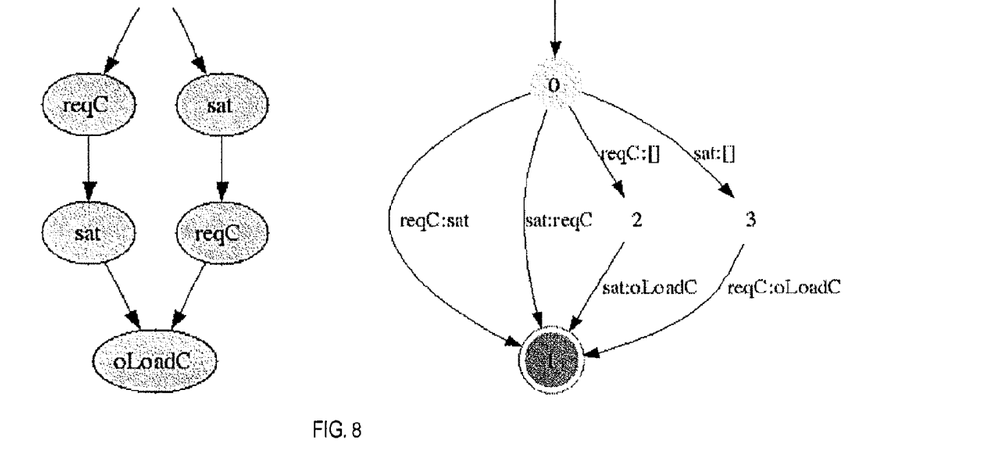
FIG. 8 shows a first learned fact.

Learned Fact 1: On Saturdays and after it was requested to host a standby link, Router C may be overloaded for same periods of time (DBN is shown to the left, FST to the right in FIG. 8).

Figure 9:
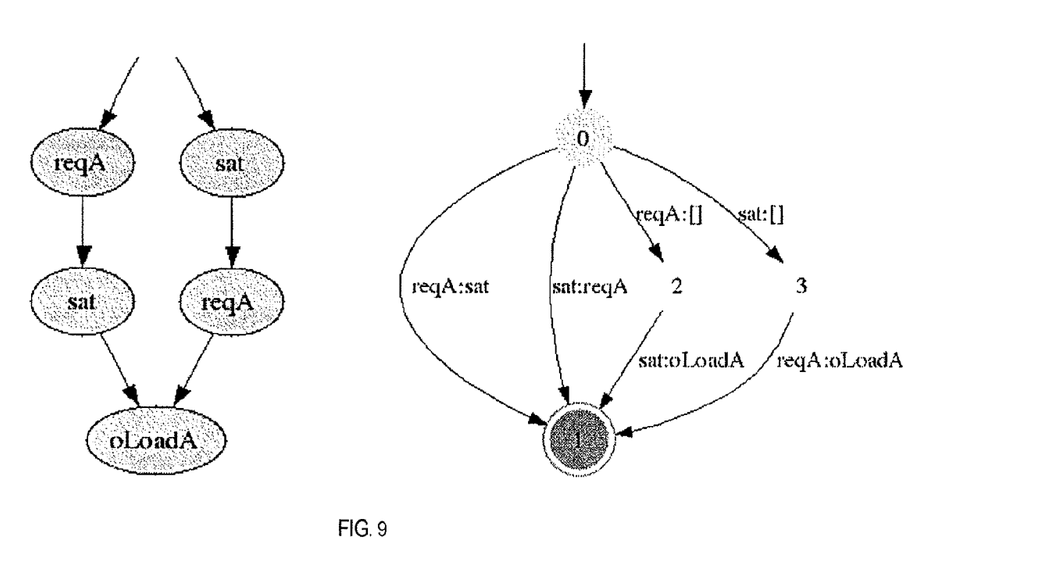
FIG. 9 shows a second learned fact.

Learned Fact 2: On Saturdays and after it was requested to host a standby link, Router A may be overloaded for same periods of time (DBN left, FST right; FIG. 9).

Figure 10:
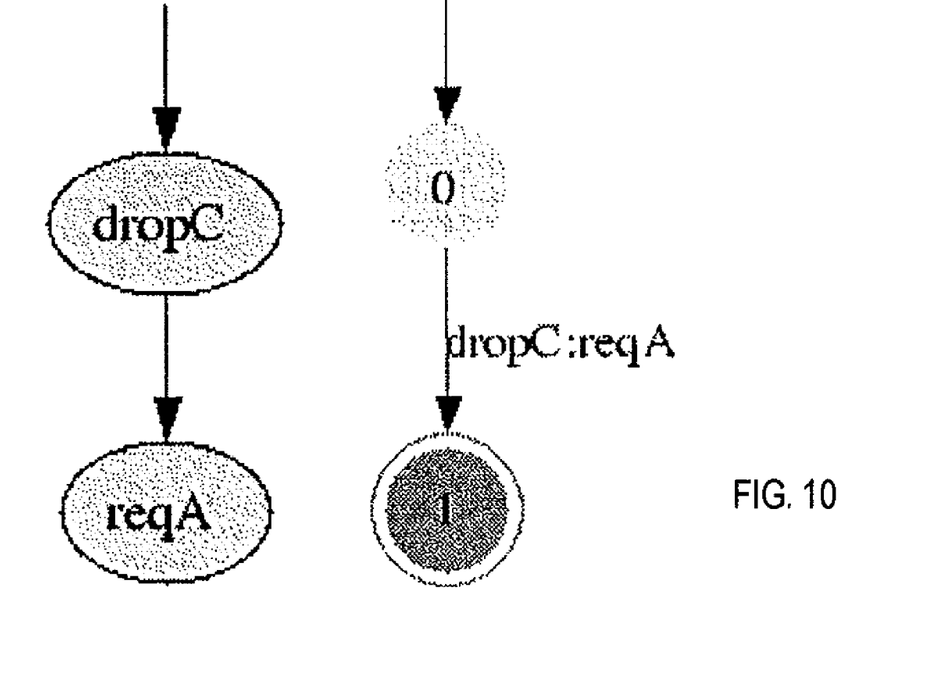
FIG. 10 shows a third learned fact.

Learned Fact 3: After Router C asks RNC to reroute standby finks, RNC requests Router A to host a standby fink (DaN left, FST right; FIG. 10).

Figure 11:
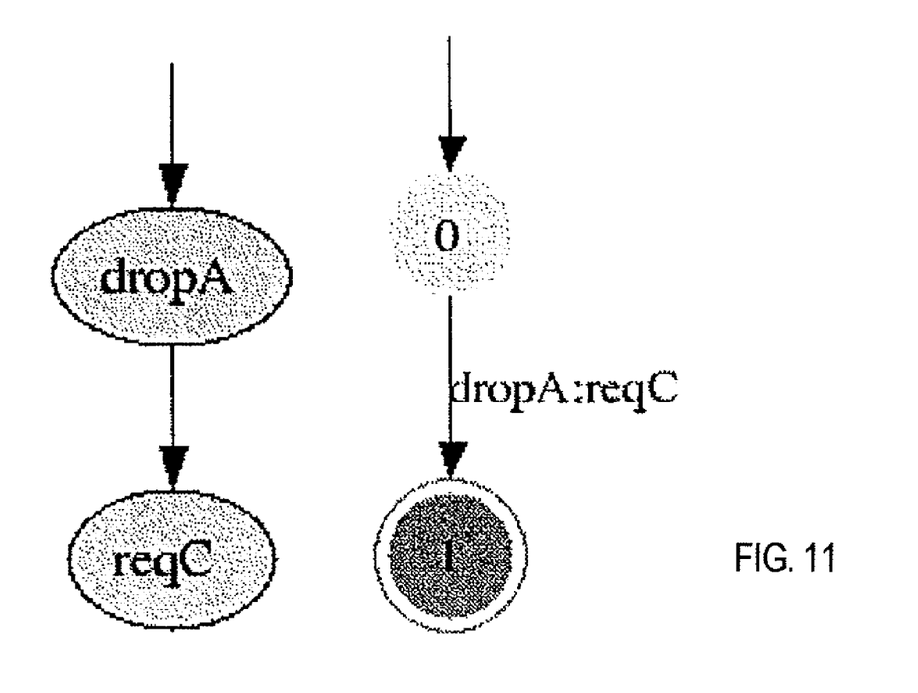
FIG. 11 shows a fourth learned fact.

Learned Fact 4: After Router A asks RNC to reroute standby links, RNC requests Router C to host a standby link (DBN left, FST right; FIG. 11).

Union of Learned Facts and Policies

All the FSTs associated with a "learned fact" have a probability associated. For the sake of simplicity, we are assuming that the probability is 1. Additionally, to combine policies and learned facts, we can assume that a policy is also a correlation between the event triggering it and the action enforced with a probability of 1.

Figure 12:
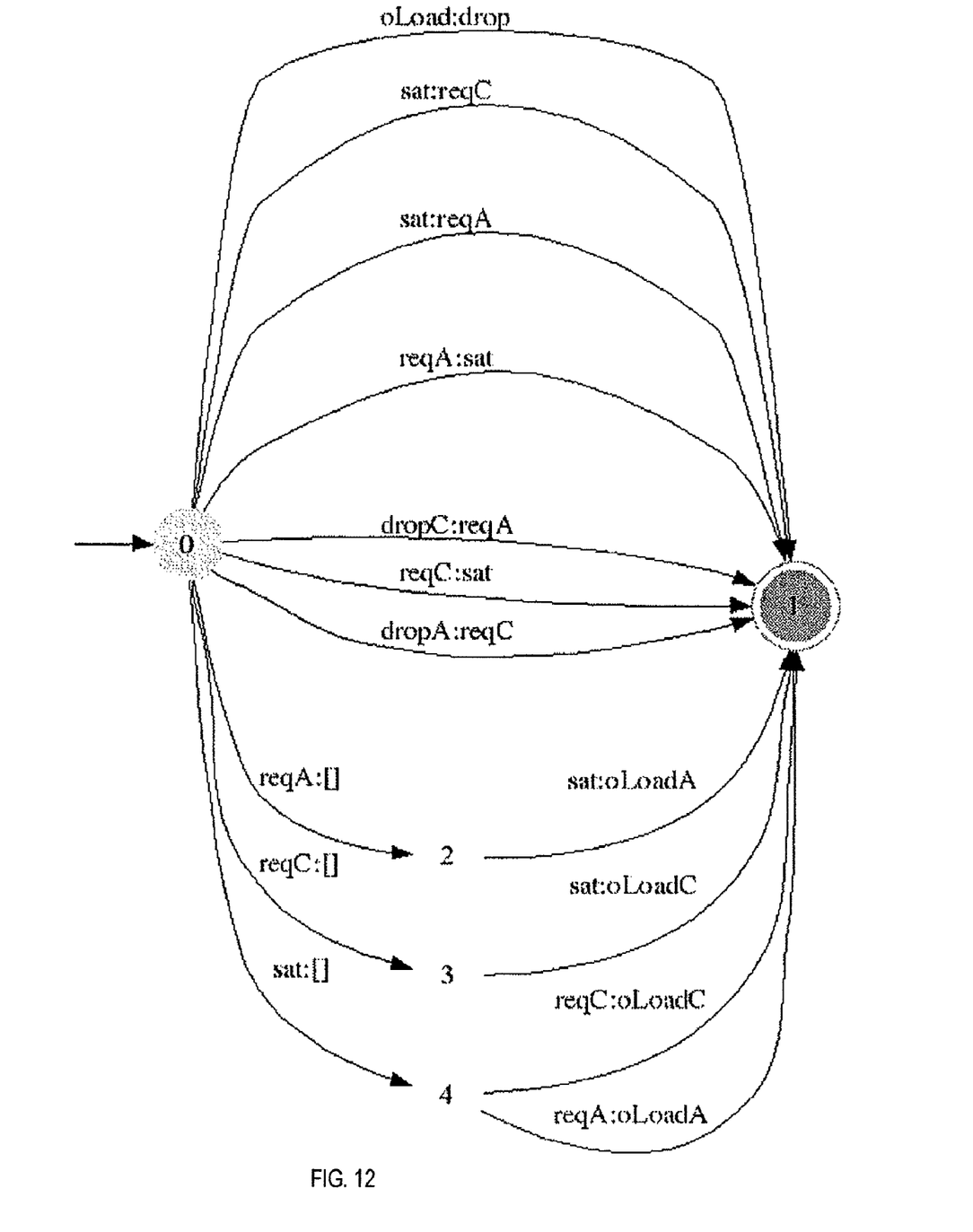
FIG. 12 shows a TFFST union of learned facts and policies.

The union (see FIG. 12) of all the learned facts plus the policies is a FST that models all the known correlation between events and actions, those that are explicitly enforced by policies and those that are just observed because they are consequence of matters out of the management system's control, for example the "natural" behavior of the network dictated by the control plane.

Composition Iteration

If we iterate composing the FST above with itself we obtain a view of what happens when the output of the system feeds back the system again as its input. The first composition produces the FST below in FIG. 13.

Figure 13:
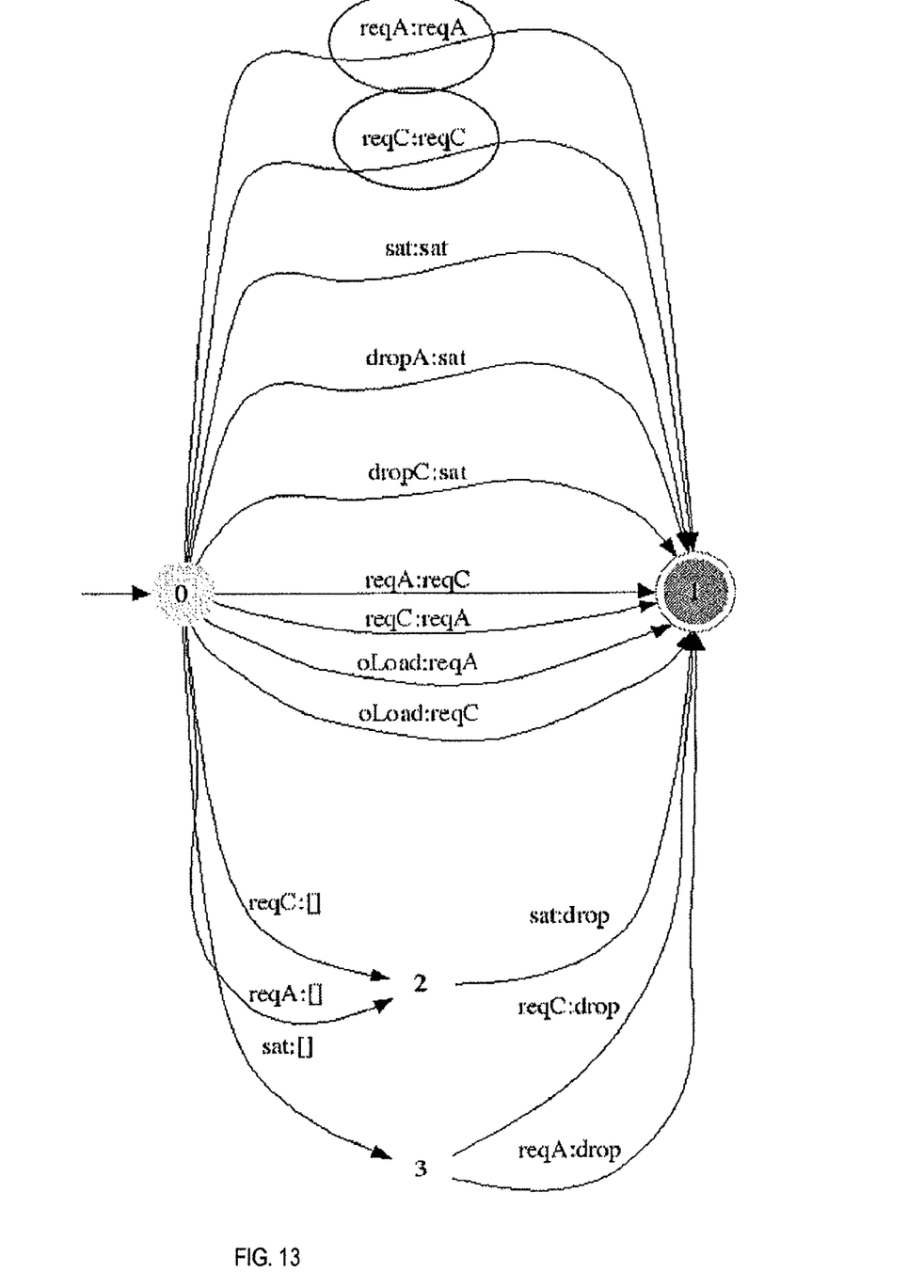
FIG. 13 shows a first composition of the "union" TFFST with itself.

Looking at FIG. 13, we notice two possible paths (with red ovals) with repetitions in the input and the output, e.g. (O)-reqA:reqA->(1). This repetition should be read as: due to the combination of policies and behavior/context which is beyond the management system's control, requesting Router A to host a standby link will cause, after a chain of events and actions, the replication of the same request. By tracing the pair of edges which generated the repetitive one, it is possible to deduce that this state of affairs occurs on Saturdays.

ADVANTAGES OF THE INVENTION

The stability of distributed policy-based and self-management communication systems is an open issue which as yet has not been tack led on a large scale. This invention is an analytic and implementable method to identify and hence reduce unstable behavior in such systems and is a basic step towards a more general theory of stability in distributed policy-based systems. A commercially viable self-management system must ensure such stability in order to realize the reduction in OPEX costs which a self-management system is intended to provide.

The method described in this document could be used both as an offline tool to assist the creation or update of policies using system wide data and on the network devices at runtime, using more accurate and up-to-date behavioral knowledge to avoid unexpected flip-flops or unbounded sequences (cascade) of reconfiguration actions.

ABBREVIATIONS

PBNM—Policy-based network management FST—Finite State Transducers BN—Bayesian networks
POP—Policy Decision Point
TFFST—Finite State Transducers extended with Tautness Functions and Identities
DAG—Directed Acyclic Graphical
DBN—Dynamic Bayesian Network RNC—Radio Network Controller RBS—Radio Base Station

REFERENCES

[1] J. Baliosian and J. Serrat, "Finite State Transducers for Policy Evaluation and Conflict Resolution," in *Proceedings of the Fifth IEEE International Workshop on Policies for Distributed Systems and Networks (POLICY 2004), June 2004, pp. 250-259.
[2] Baliosian, J. Oliver, Ho, Devitt, A., Sa il han, F., Sala man ca, E., Danev, B., Parr, G. "Self-configuration for Radio Access Networks". To be published in proceedings of the 7th IEEE Workshop on Policies for Distributed Systems and *Networks* (Policy 2006) Jun. 5-7 2006, London, Canada.
[3] K. Korb and A. E. Nicholson, "Bayesian Artificial Intelligence", Chapman & Hall/CRC, 2004
[4] A. E. Nicholson, "Monitoring Discrete Environments using Dynamic Belief Networks", PhD thesis, Department of Engineering, Oxford, 1992.
[5] A. Westerinen, J. Schnizlein, J. Strassner, M. Scherling, B. Quinn, S. Herzog, A. Huynh, M. Carlson, J. Perry, S. Waldbusser, "Terminology for Policy-Based Management", RFC 3198, November 2001.

The invention claimed is:

1. A method for determining possible unstable policy enforcement in a policy based network management system, the system being based on a local network model (LNM) having prior knowledge about network configuration constraints and procedures, a behavior model (BM) to log and summarize over individual events to provide a general view of the activity of network devices, whereby the behavior model (BM) represents and learns knowledge about the network behavior and is represented by a dynamic Bayesian network (DBN), a policy model (PM) comprising a policy decision point to listen for events and to evaluate the conditions and logical policies to decide whether a policy condition has been met and whether attendant reconfigurations must be performed in consequence, wherein the method determines possible consequences of enforcing a given policy to evaluate the effects of activities, the method comprising the steps of:

translating a Bayesian network (DBN) that represents a Behavior Model (BM) into finite state transducers extended with tautness functions and identities;

computing a union of the translated Bayesian network (DBN) finite state transducers and a policy model (PM) finite state transducers extended with tautness functions and identities;

composing, in a first iteration, the union of the finite state transducers extended with tautness functions and identities produced in the computing step with itself; and determining a possible network instability to be detected if the composed finite state transducers extended with tautness functions and identities have the same event in an input and an output of any possible path.

2. The method of claim 1 wherein translating a Bayesian network (DBN) comprises creating the finite state transducers extended with tautness functions and identities such that each event of the Bayesian network (DBN) is a consequence of its parent events in a (DBN) graph.

3. The method of claim 2 wherein creating the finite state transducers extended with tautness functions and identities comprises recursively performing the following steps:

transforming every Bayesian network (DBN) state that is not initial into a final state;

finding every valid path in the Bayesian network (DBN);

for each valid path found in the Bayesian network (DBN), creating the finite state transducers extended with tautness functions and identities such that the finite state transducers has an edge for each state in the path except for the last state, and wherein the created finite state transducers extended with tautness functions and identities edges are linked by states in the same order that they appear in the (DBN) paths, and wherein for each of the finite state transducers extended with tautness functions and identities edges, the input label is the label in the correspondent Bayesian network (DBN) state and the output label is the null label except for the last edge where the output label is the label on the last state of the Bayesian network (DBN) path; and joining together all of the obtained finite state transducers extended with tautness functions and identities by a union operation.

4. The method of claim 1 wherein if no composed finite state transducer extended with tautness functions and identities has a same event in the input and the output of any possible path after the first iteration:

composing the union of the finite state transducers extended with tautness functions and identities produced in the computing step with the finite state transducers extended with tautness functions and identities produced in a last iteration; and determining a possible network instability to be detected if the composed finite state transducers extended with tautness functions and identities has the same event in the input and the output of any possible path.

5. The method of claim 1 wherein if no repetitions of events in the input and the output of every possible path are found:

checking if a maximum allowable path length has been exceeded over a minimum value; and if the maximum path length has been exceeded, determining that no network instability is to be detected.

6. The method of claim 5 wherein if the maximum path length has not been exceeded, repeating the step of composing the union of the finite state transducers extended with tautness functions and identities produced in the computing step with the finite state transducers extended with tautness functions and identities produced in a last iteration.

* * * * *

UNITED STATES PATENT AND TRADEMARK OFFICE
CERTIFICATE OF CORRECTION

| | | |
|---|---|---|
| PATENT NO. | : 8,150,788 B2 | |
| APPLICATION NO. | : 12/302411 | |
| DATED | : April 3, 2012 | |
| INVENTOR(S) | : Baliosian et al. | |

It is certified that error appears in the above-identified patent and that said Letters Patent is hereby corrected as shown below:

On the Face Page, in Field (74), under "Attorney, Agent, or Firm", in Column 2, Line 1, delete "Coates" and insert -- Coats --, therefor.

In Fig. 14, Sheet 9 of 9, delete "FIG" and insert -- FIG. --, therefor.

In Column 1, Line 33, delete "TFFST" and insert -- TFFST, --, therefor.

In Column 1, Line 35, delete "right" and insert -- right, --, therefor.

In Column 1, Line 38, delete "scheme" and insert -- scheme, --, therefor.

In Column 1, Line 39, delete "TFFST" and insert -- TFFST, --, therefor.

In Column 3, Line 63, delete "(TFFST_BM)." and insert -- (TFFST_BM), --, therefor.

In Column 3, Line 67, delete "TFFST_0)." and insert -- TFFST_0), --, therefor.

In Column 4, Line 10, delete "path." and insert -- path, --, therefor.

In Column 4, Line 17, delete "iteration." and insert -- iteration, --, therefor.

In Column 4, Line 22, delete "TFFST_0:" and insert -- TFFST_0; --, therefor.

In Column 4, Line 24, delete "TFFST_i+1)." and insert -- TFFST_i+1), --, therefor.

In Column 5, Line 59, delete "a again," and insert -- again, --, therefor.

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,150,788 B2

In Column 7, Line 39, delete "left," and insert -- lett, --, therefor.

In Column 8, Line 49, delete "2004" and insert -- 2004. --, therefor.